US006979398B2

(12) United States Patent
Veilleux et al.

(10) Patent No.: US 6,979,398 B2
(45) Date of Patent: Dec. 27, 2005

(54) SYSTEM FOR THE TREATMENT OF WASTEWATER

(76) Inventors: Gontran Veilleux, 12,830, 2nd avenue E., Saint-Georges, Québec (CA) G5Y 1Y3; Blaise Bégin, 3314, Chamin Royal, Notre-Dame-des-Pins, Québec (CA) G0M 1K0

( * ) Notice: Subject to any disclaimer, the term of this patent is extended or adjusted under 35 U.S.C. 154(b) by 5 days.

(21) Appl. No.: 10/735,556

(22) Filed: Dec. 12, 2003

(65) Prior Publication Data

US 2004/0124138 A1 Jul. 1, 2004

Related U.S. Application Data

(63) Continuation of application No. PCT/CA02/01922, filed on Dec. 12, 2002.

(51) Int. Cl.7 ........................... B01D 17/12; C02F 3/20

(52) U.S. Cl. ................... 210/143; 210/198.1; 210/199; 210/205; 210/150; 210/220; 210/532.2

(58) Field of Search ................................ 210/739–746, 210/749, 752, 143, 198.1, 199, 205, 150, 210/220, 615, 616, 617, 618, 532.2

(56) References Cited

U.S. PATENT DOCUMENTS

| | | |
|---|---|---|
| 3,627,135 A | 12/1971 | Goodman |
| 4,895,645 A | 1/1990 | Zorich, Jr. |
| 5,194,144 A | 3/1993 | Blough |
| 5,609,754 A | 3/1997 | Stuth |
| 5,739,031 A | 4/1998 | Runyon |
| 6,372,137 B1 | 4/2002 | Bounds |
| 6,461,500 B1 | 10/2002 | Hoage et al. |
| 6,531,062 B1 | 3/2003 | Whitehill |

FOREIGN PATENT DOCUMENTS

| | | |
|---|---|---|
| FR | 2 818 265 | 6/2002 |
| WO | WO 03/055808 | 7/2003 |
| WO | WO 04/052795 | 6/2004 |

OTHER PUBLICATIONS

International Search Report for counterpart International Application No. PCT/CA02/01922, completed Aug. 15, 2003.

*Primary Examiner*—Chester T. Barry
(74) *Attorney, Agent, or Firm*—Lorusso & Associates

(57) ABSTRACT

A method and system for the treatment of wastewater is described herein. The system determines a quantity of fresh water entering a building and supplies a quantity of wastewater treatment solution on a basis of the quantity of entering fresh water. The system includes a conventional septic tank and two sanitization modules connected in series and automatically controlled by a controller. Compressed air and aseptic solution may also be supplied.

27 Claims, 10 Drawing Sheets

SYSTEM FOR THE TREATMENT OF WASTEWATER

CROSS-REFERENCE TO RELATED APPLICATIONS

This application is a continuation of International Application No. PCT/CA02/01922, filed Dec. 12, 2002.

FIELD OF THE INVENTION

The present invention relates to a system and a method for the treatment of wastewater. More specifically, the present invention is concerned with such a method and apparatus where the wastewater is supplied in free flow.

BACKGROUND OF THE INVENTION

The basic technique involved in the treatment of wastewater of any kind of aqueduct network, generally consists in carrying the wastewater coming out of buildings to a wastewater treatment plant that will treat and reduce the level of contamination therein.

As for the organized sewerage systems, even though they have been effective enough to reduce as high as 90% of the contamination level of the treated water rejected into the streams, their level of stability is rather low. Indeed, the conventional systems are vulnerable to external forces or even subject to their own deficiencies such as, for example:

- unequal supply of the wastewater, mainly due to steep or abrupt soil;
- complex mechanics which will in time result in the breakage of components of the treatment system; and
- unstable effluent which stems from similar reason as the unequal supplying problem.

For treating wastewater, several known techniques, particularly those used for the residential network, are faced with the previously discussed drawbacks.

An example of such technology is a "rotational BIO-DISK", as referred to in the art, which constitutes a rotating biologic contactor. This apparatus generates reactions of natural biodegradation and BOD (Biochemical Oxygen Demand) to realize nitrification and denitrification treatments of wastewater.

Unfortunately, one drawback of using this technology is the presence of underground electrical units which makes maintenance difficult. Furthermore, the useful life of these underground elements is relatively short. In addition, the expensive maintenance and unstable waste complicate the operating process.

The wastewater technology known as disposal is faced with similar problems. As his name implies, it is used for disposing or storing wastewater (or any type of polluted liquid).

Notwithstanding the two preceding conventional wastewater treatment technologies, the most conventional and frequently employed wastewater treatment system for remote dwelling units is the combination septic tank/purification plant. As well known to those skilled in the art, a septic tank is a waterproof reservoir that receives wastewater for its subsequent purification in the soil. As for the purification plant, also known as a drainfield, it is a sub-system that receives the effluent of the septic tank and executes the bioremediation action. i.e., a biological cleanup operation which generate a reduction of the concentration of bacterial in a selected contaminated area.

Nevertheless, the above-mentioned techniques are subject to a common problem: the noticeable presence of pollution in the area in which the wastewater is discharged.

In addition, even if the foregoing conventional method, i.e. the septic tank/purification plant combination, has been a common use for quite some time now, its use comes with several drawbacks such as:

- the decreased watertightness of the septic tank;
- the reduced permeability capacities of the soil just off the groundwater sheet which lowers the efficiency of the drainfield; and
- contamination of the clean water well.

Consequently, it can be understood that there is an obvious need for an improved wastewater treatment technique.

OBJECTS OF THE INVENTION

An object of the present invention is therefore to provide an improved wastewater treatment system and method.

SUMMARY OF THE INVENTION

More specifically, according to an aspect of the present invention, there is provided a system for treating wastewater from a building including a fresh water inlet and a wastewater outlet connected to a septic tank; said system comprising:

- a wastewater sanitization assembly including:
  - a first sanitization module provided downstream from the septic tank;
  - a second sanitization module provided downstream from said first sanitization module;
- a control assembly including:
  - a controller;
  - a fresh water sensor associated with the fresh water inlet and connected to said controller to supply fresh water entry data to said controller;
  - a first reservoir to contain a first wastewater treatment solution;
  - a first pump controlled by said controller and provided between said first reservoir and the wastewater outlet;
  - a second reservoir to contain a second wastewater treatment solution;
  - a second pump controlled by said controller and provided between said second reservoir and said second sanitization module;
- wherein said controller controls said first and second pumps so that a) a quantity of the first wastewater treatment solution supplied to said wastewater outlet is a function of the sensed freshwater entering said building; and b) a quantity of the second wastewater treatment solution supplied to said second sanitization module is a function of the sensed freshwater entering said building.

According to another aspect of the present invention, there is provided a method for treating wastewater from a building including a fresh water inlet and a wastewater outlet connected to a septic tank, said method comprising the acts of:

measuring a quantity of fresh water entering the building;

providing a first sanitization module downstream from the septic tank;

providing a second sanitization module downstream from the first sanitization module;

dispensing a quantity of a first wastewater treatment solution to the wastewater outlet; the quantity of the first wastewater treatment solution dispensed being a function of the measured quantity of fresh water entering the building; and dispensing a quantity of a second wastewater treatment solution to the second sanitization module; the quantity of the second wastewater treatment solution dispensed being a function of the measured quantity of fresh water entering the building.

According to another aspect of the present invention, there is provided a system for treating wastewater from a building including a fresh water inlet and a wastewater outlet; said system comprising:

a sanitization assembly having an inlet connected to the wastewater outlet of the building and a treated wastewater outlet;

a controller;

a sensor associated with said sanitization assembly and connected to said controller to supply thereto data indicative of a quantity of wastewater present in the sanitization assembly;

an output pump controlled by said controller and having an inlet connected to said treated wastewater outlet and an outlet connected to the environment;

wherein, when said sensor indicates that the quantity of wastewater in said sanitization assembly has reached a predetermined level, said controller controls said output pump so as to eject a predetermined amount of treated wastewater from the sanitization assembly to the environment.

According to yet another aspect of the present invention, there is provided a method for treating wastewater from a building including a fresh water inlet and a wastewater outlet connected to a sanitization assembly having a treated wastewater outlet, said method comprising the acts of:

measuring a parameter indicative of a quantity of wastewater present in the sanitization assembly; and upon reaching a predetermined value of the parameter:

ejecting a predetermined amount of treated wastewater to the environment via the treated wastewater outlet; and injecting a quantity of a first wastewater treatment solution in the sanitization assembly, the quantity of the first wastewater treatment solution being a function of the predetermined amounted of treated wastewater ejected to the environment.

It is to be understood that, for concision purposes, the term "pump" used herein and in the appended claims is to be construed as a conventional pump and as any other means that can either allow and/or force fluid from one container or reservoir to another. For example, a valve connected to a pressurized reservoir would be construed herein as a pump. Similarly, a ventury-type assembly by which a predetermined ratio of fluid is taken from a reservoir under the suction action of a running fluid or an electric dosimeter would also be construed herein as a pump.

DESCRIPTION OF PREFERRED EMBODIMENTS

In a nutshell, the present invention involves a method and an apparatus for treating wastewater. The system conveys and controls the wastewater from a dwelling unit to a conventional septic tank connected to two sanitization modules which will degenerate, by means of a treatment solution injecting device, the biodegradable compounds present therein. Subsequently, the treated wastewater is discharged to the environment.

A first embodiment of the present invention will now be described with reference to the appended FIGS. 1 to 3.

Figure 1:
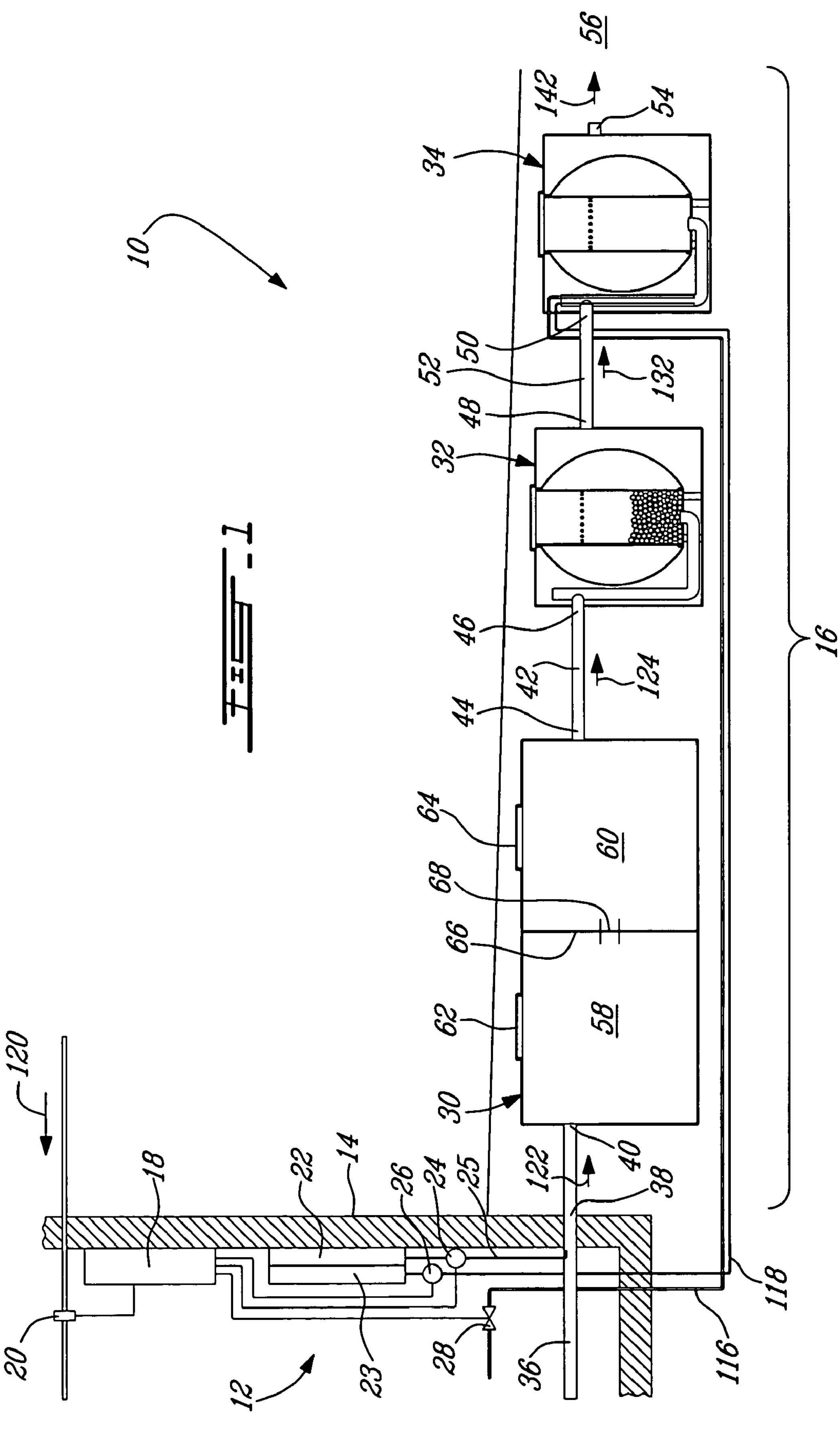
FIG. 1 is a schematic sectional side elevational view of a wastewater treatment system according to a first embodiment of the present invention.

A wastewater treatment system 10 is illustrated in FIG. 1 of the appended drawings. It can be seen from this figure that the system is constituted of a control assembly 12, which is located inside a building 14 and a wastewater sanitization assembly 16 located outside the building 14.

The control assembly 12 includes a controller 18 comprising an integrated electronic circuit (not shown), a flow sensor 20, connected to the controller 18, which detects the amount of freshwater entering in the building 14 and two reservoirs 22, 23 which contain wastewater treatment solutions. More specifically, the reservoirs 22 and 23 respectively contain a solution containing enzymes and bacteria, such as, for example Oxisan PA-5™ made by Constant Laboratories (Montreal, Quebec, Canada), and an aseptic solution, such as, for example, liquid certi-zyme III™ made by Certified Lab Products, a division of NCH Canada Inc, as will be described hereinbelow. Of course, other solutions could be used.

The control assembly 12 also includes a first electrically controlled pump 24 to control the quantity of enzyme and bacteria containing solution supplied to the wastewater sanitization assembly 16 via a conduit 25; a second electrically controlled pump 26 to control the quantity of aseptic solution supplied to the wastewater sanitization assembly 16 via a conduit 118 and a third electrically controlled valve 28 to control the quantity of compressed air supplied from a compressed air source (not shown) to the wastewater sanitization assembly 16 via a conduit 116. The two electrically controlled pumps 24, 26 and the electrically controlled valves 28 are controlled by the controller 18.

Of course, one skilled in the art could forego the pumps 24 and 26 by valves, should the reservoirs 22 and 23 be pressurized, for example. For concision purposes, the term pump will be used herein but should be construed as any element that allows and/or forces fluid to be transferred from one container or reservoir to another.

As will be apparent to one skilled in the art the valve 28 could be replaced by a compressor (not shown) controlled by the controller 18 to supply compressed air as will be described hereinbelow.

As stated hereinabove, the wastewater sanitization assembly 16 illustrated in FIG. 1 is the outdoor and treating portion of the system 10. Indeed, it includes a septic tank 30 and a series of a two sanitization modules 32 and 34, all serially connected by conduits which carry the wastewater from one element to another as will be described hereinbelow.

A first conduit 36, defining the wastewater outlet 38 of the building 14 carries out the free flowing wastewater from the building 14 to the inlet 40 of the wastewater sanitization assembly 16 defined by the inlet of the conventional septic tank 30.

A second conduit 42 transfers the wastewater from the outlet 44 of the conventional septic tank 30 to the inlet 46 of the first sanitization module 32. The water exiting the first sanitization module 32 via its outlet 48 is transferred to the inlet 50 of the second module 34 by a third conduit 52. Finally, a fourth conduit 54 transfers the treated water from the second sanitization module 34 to the external environment 56.

The septic tank 30 is conventional. It therefore includes two compartment 58 and 60, provided with respective covers 62, 64. The compartments are divided by a wall 66 provided with an aperture 68.

As will easily be understood by one skilled in the art, the septic tank 30 will conventionally collect the major portion of the solid matter contained in the wastewater transferred thereto via the conduit 36.

As illustrated in FIG. 1, the injection of the enzyme and bacteria containing solution from the reservoir 22 via the valve 24 is done prior to the entry of the wastewater in the septic tank 30. Therefore, the wastewater entering the septic tank 30 contains a predetermined amount of the enzyme and bacteria containing solution.

The first sanitization module 32 will now be described with respect to FIG. 2.

The sanitization module 32 includes a body 70 provided with a top aperture 72 closed by a removable cover 74. The module 32 also includes a vertical and cylindrical container 76 inserted in the body 70 via the aperture 72, and a filtering pouch 78 provided with first and second mounting rings 80 and 82 configured and sized to be snugly mounted to container 76 so as to enclose the container 76. The filtering pouch 78 is made of geo-textile material, a durable material that is adequate to filter a portion of the suspended matter in the wastewater as will be described hereinbelow. Of course, other adequate filtering materials could be used.

The inlet 46 of the first sanitization module 32 is connected to a bottom inlet 84 of the vertical container 76 via a J-shaped conduit 86. Therefore, the container 76 will be filled from underneath as will be described in the foregoing disclosure. The conduit 86 is provided with a vent 88 to prevent backflow.

The vertical and cylindrical container 76 is provided with peripheral outlet apertures 90 allowing the wastewater to flow from the container 76 to the filtering pouch 78.

It is to be noted that since the system 10 operates in free flow, the apertures 90 are slightly lower than the inlet 46; and the outlet 48 is slightly lower than the apertures 90.

Small polymer "balls" 92, which will be referred herein as "bio-media elements", fill the vertical container 76. These bio-media elements 92, which operate as a non-clogging media, attract the bacteria injected in the wastewater to improve the reduction of the molecular organic load present in the wastewater by increasing the contact surface between the bacteria and the wastewater.

The bio-media elements 92 are generally spherical and provided with channels in their external surface to increase the area of contact between the bacteria and the wastewater. It has been found that bio-media elements having an area ranging from about 20 to about 500 square feet by cubic feet are adequate for the use in the present application. It has been found that the product Fabco/Jaeger Tri-Packs® made by Fabco Plastiques Inc. is adequate for this application.

Figure 2:
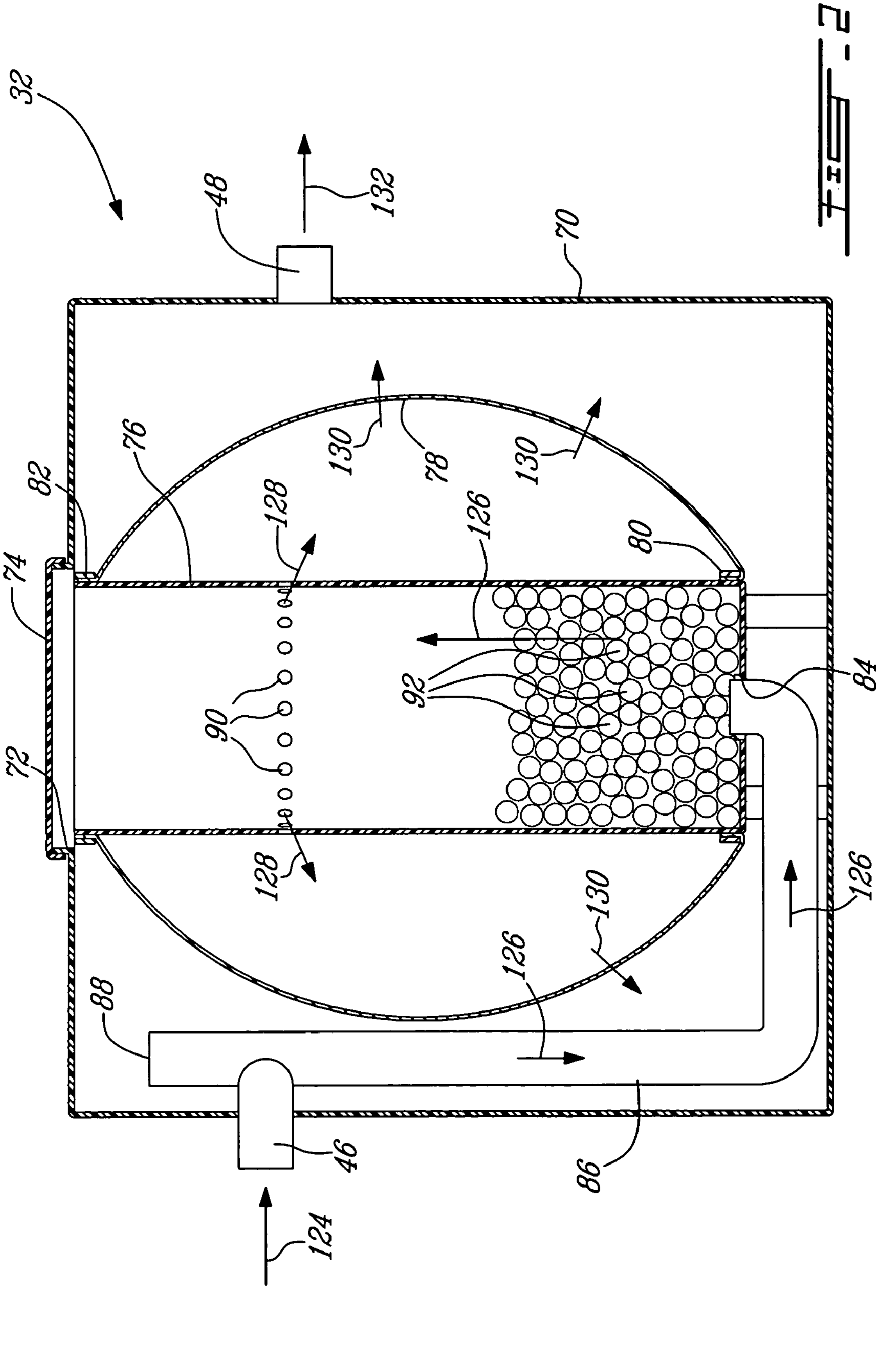
FIG. 2 is a schematic sectional side elevational view of the second sanitization module of the wastewater treatment system of FIG. 1.

It should be mentioned that while the bio-media elements 92 illustrated in FIG. 2 are spherical, other shapes can be used, for example, serrated cylindrical shaped elements (not shown) could be used.

Furthermore, one skilled in the art will understand that other elements could be used in place of the bio-media elements 92. For example, bio-media elements made of pieces of geo-textile material could be used to increase the surface of contact between the bacterial injected and the wastewater.

As will easily be understood by one skilled in the art, the wastewater entering the vertical container 76 via the bottom inlet 84 upwardly percolates through the bio-media elements 92 before reaching the apertures 90 and are therefore submitted to the bacterial action of the bacteria present on the surface of the bio-media elements 92.

Therefore, one skilled in the art will understand that to go from the inlet 46 to the outlet 48, the wastewater must go through the bio-media elements 92 and through the filtering pouch 78.

As mentioned hereinabove with reference to FIG. 1, the wastewater is transferred from the outlet 48 of the first module 32 to the inlet 50 of the second module 34 via a conduit 52.

Figure 3:
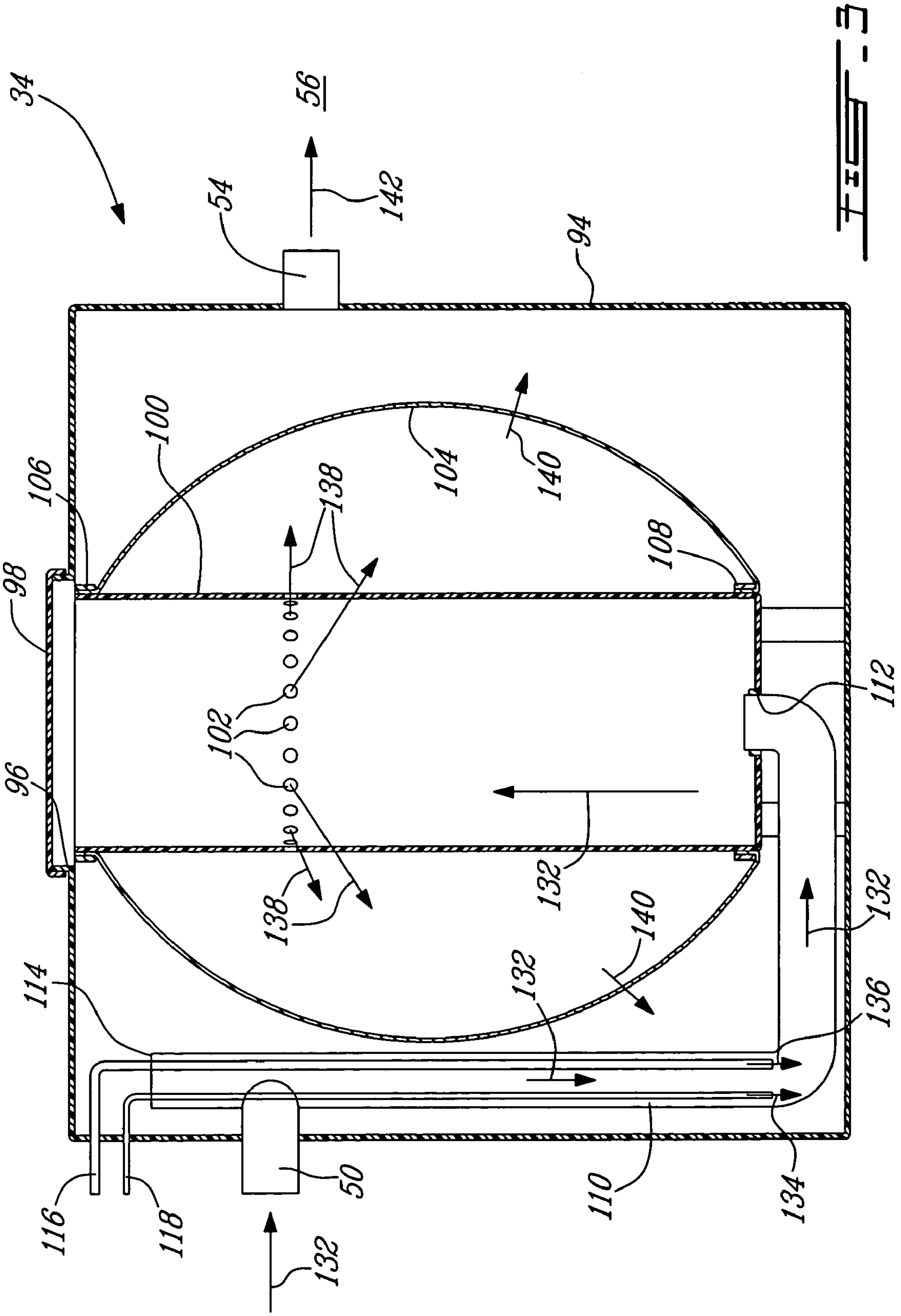
FIG. 3 is a schematic sectional side elevational view of the third sanitization module of the wastewater treatment system of FIG. 1.

The second module 34, illustrated in FIG. 3, is very similar to the second module described hereinabove with respect to FIG. 2.

More specifically, the second module 34 includes a body 94 provided with an aperture 96 closed by a cover 98, a vertical and cylindrical container 100 provided with apertures 102, a filtering pouch 104 provided with top and bottom mounting rings 106 and 108, respectively, a J-shaped conduit 110 connecting the inlet 50 to a bottom aperture 112 of the container 100 and provided with a vent 114.

The second module 34 also includes two additional conduits 116 and 118. The conduit 116 is connected to the electrically controlled valve 28, thereby allowing compressed air to be injected in the J-shaped conduit 110 and into the vertical container 100. Similarly, the conduit 118 is connected to the electrically controlled pump 26, thereby allowing the aseptic solution contained in the reservoir 23 to be injected in the J-shaped conduit 110, as will be described hereinbelow.

It is to be noted that the filtering pouches 78 and 104 of the modules 32 and 34, respectively, may be removed through the apertures 72 and 96 for cleaning purposes.

It is also to be noted that the bodies 70 and 94 are made of a material that is suitable to be buried, such as, for example, plastic or composite material.

Returning to FIG. 1 of the appended drawings, the operation of the wastewater treatment system 10 will be described. The quantity of fresh water entering the building 14 (see arrow 120) is detected by the sensor 20 and this information is supplied to the controller 18. The controller 18 may then dynamically determine the amount of enzyme and bacteria containing solution to transfer from the reservoir 22 to the septic tank 30 via the conduit 36 and the amount of aseptic solution to transfer from the reservoirs 23 to the second module 34 via the conduit 36. Similarly, the injection of compressed air via the valve 28 is also controlled according to the amount of fresh water entering the building 14. Indeed, the system 10 operates on the assumption that a major portion of the fresh water entering a building becomes wastewater in a relatively short time. It is therefore possible to forego the more complicated calculation of the quantity of wastewater exiting from the building 14.

The wastewater, represented by arrow 122, coming out of the building 14, is transferred to the septic tank 30 via the conduit 36. In the conventional septic tank 30, the wastewater undergoes a decantation process and is naturally mixed with the enzyme and bacteria containing solution. This constitutes a first phase of the treatment process of the wastewater where a portion of the suspended solid matter is conventionally removed from the wastewater.

The decanted wastewater then flows from the septic tank 30 to the first sanitization module 32 via the conduit 42 (see arrow 124). In the first module 32, a second phase of the wastewater treatment takes over. In this second phase, the solid matter still in suspension in the decanted wastewater is treated in the bio-media elements 92. Indeed, to go to the outlet 48 from the inlet 46, the decanted wastewater has to pass upwardly through the bio-media elements 92 (see arrows 126). Since microorganisms are attached to the bio-media elements to reduce the molecular organic load present in the wastewater, a "digestion" of the organic matter takes place in the container 76.

After being submitted to this digestion process, the wastewater exits from the container 76 via the apertures 90 (see arrows 128 in FIG. 2) and thereby enters the filtering pouch 78. By going through the filtering pouch 78 (see arrows 130 in FIG. 2), smaller suspended digested solid particles are filtered from the wastewater.

The wastewater is then transferred to the second sanitization module 34 via the conduit 52 (see arrow 132).

As mentioned hereinabove, the aseptic solution delivery tube 118 and the compressed air supply tube 116 are inserted in the J-shaped tube 110 via its vent 114.

As may be better seen in FIG. 3, due to the simultaneous action of the injected pressurized air (see arrow 136) through tube 116 and of the aseptic solution (see arrow 134) through tube 118, a better diffusion of the aseptic solution in the container 100 may take place.

Again, once the wastewater exits from the apertures 102 (see arrow 138), it still has to go through the pouch 104 (see arrow 140) to be filtered thereby.

As will be easily understood by one skilled in the art, the purpose of the injection of the aseptic solution in the module 34 is to kill the bacteria present in the treated wastewater. Even though Oxisan PA-5 is a possible aseptic solution, one skilled in the art that other substances such as, chlorine or hydrogen peroxide, for example, could be used.

It is to be noted that should chlorine be used, it would be advantageous to provide a chlorine filter in which the treated wastewater could go through before being released in the external environment 56. Such a filter could be provided after the sanitization module 34 and could take the form of a third module (not shown) similar to the module 34 but where the cylindrical container would be filled with activated carbon.

Finally, the now purified wastewater (see arrow 142) is carried out of the system 10, throughout the outlet 54 into the external environment 56.

Figure 4:
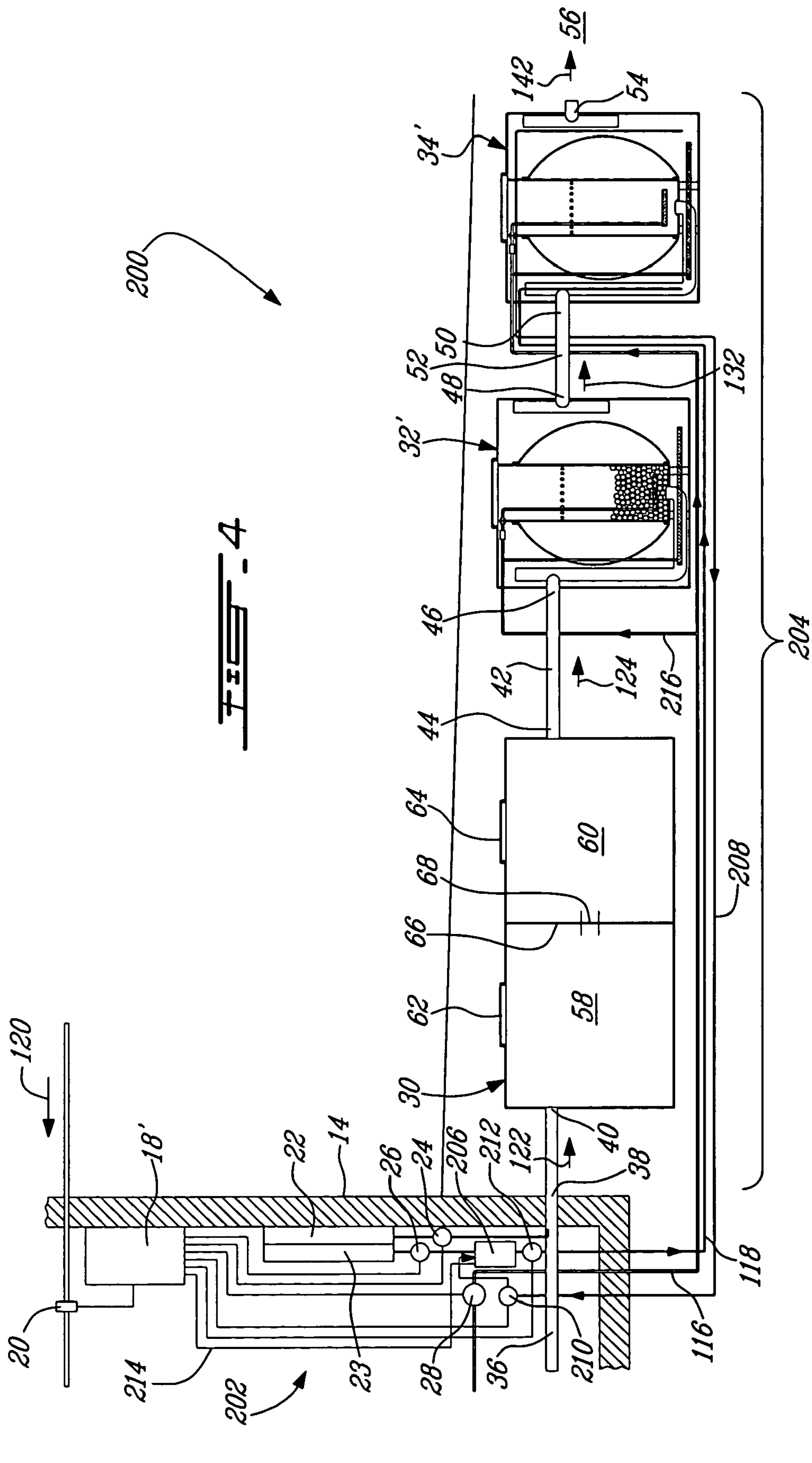
FIG. 4 is a schematic sectional side elevational view of a wastewater treatment system according to a second embodiment of the present invention.
Figure 5:
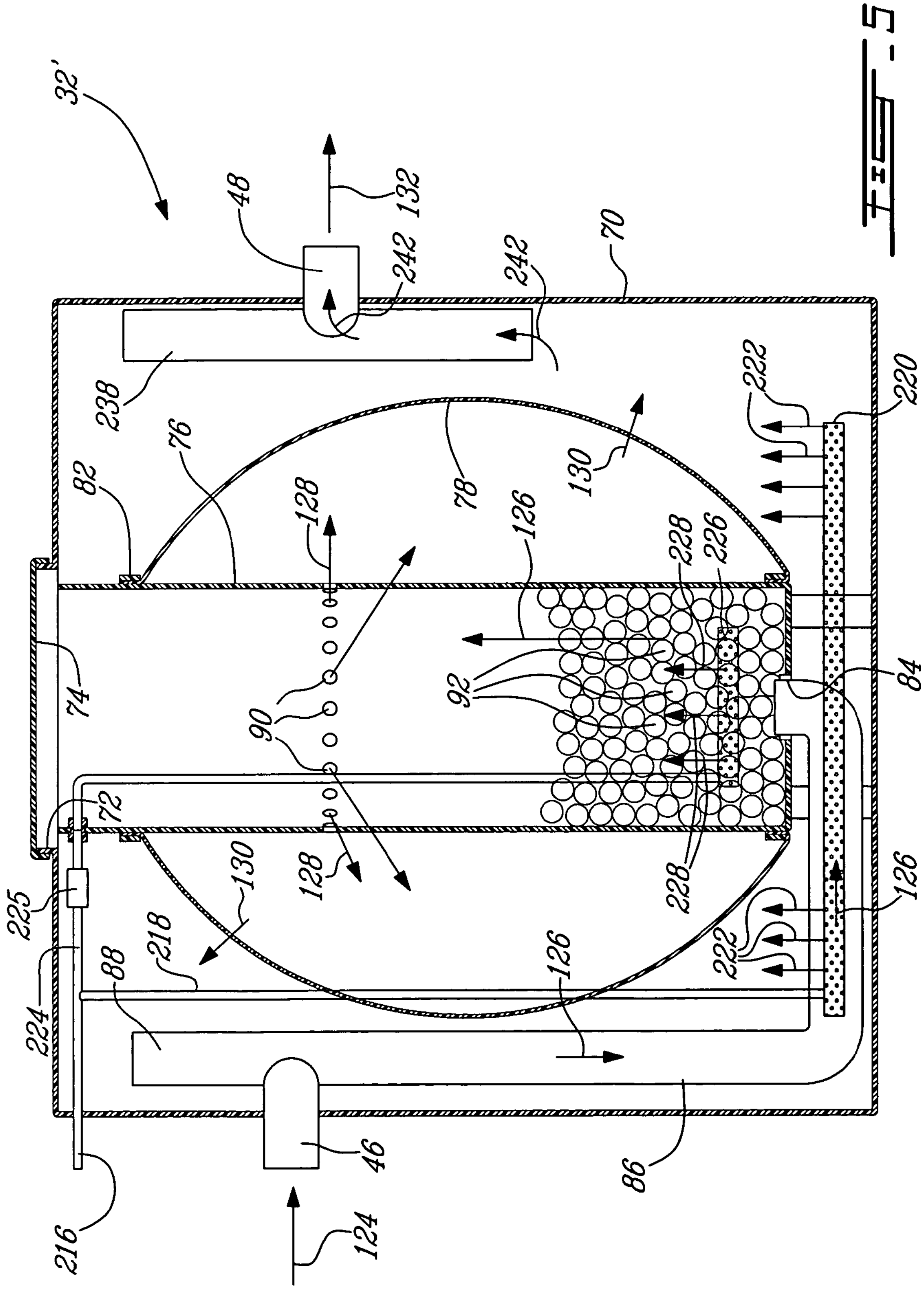
FIG. 5 is a schematic sectional side elevational view of the second sanitization module of the wastewater treatment system of FIG. 4.
Figure 6:
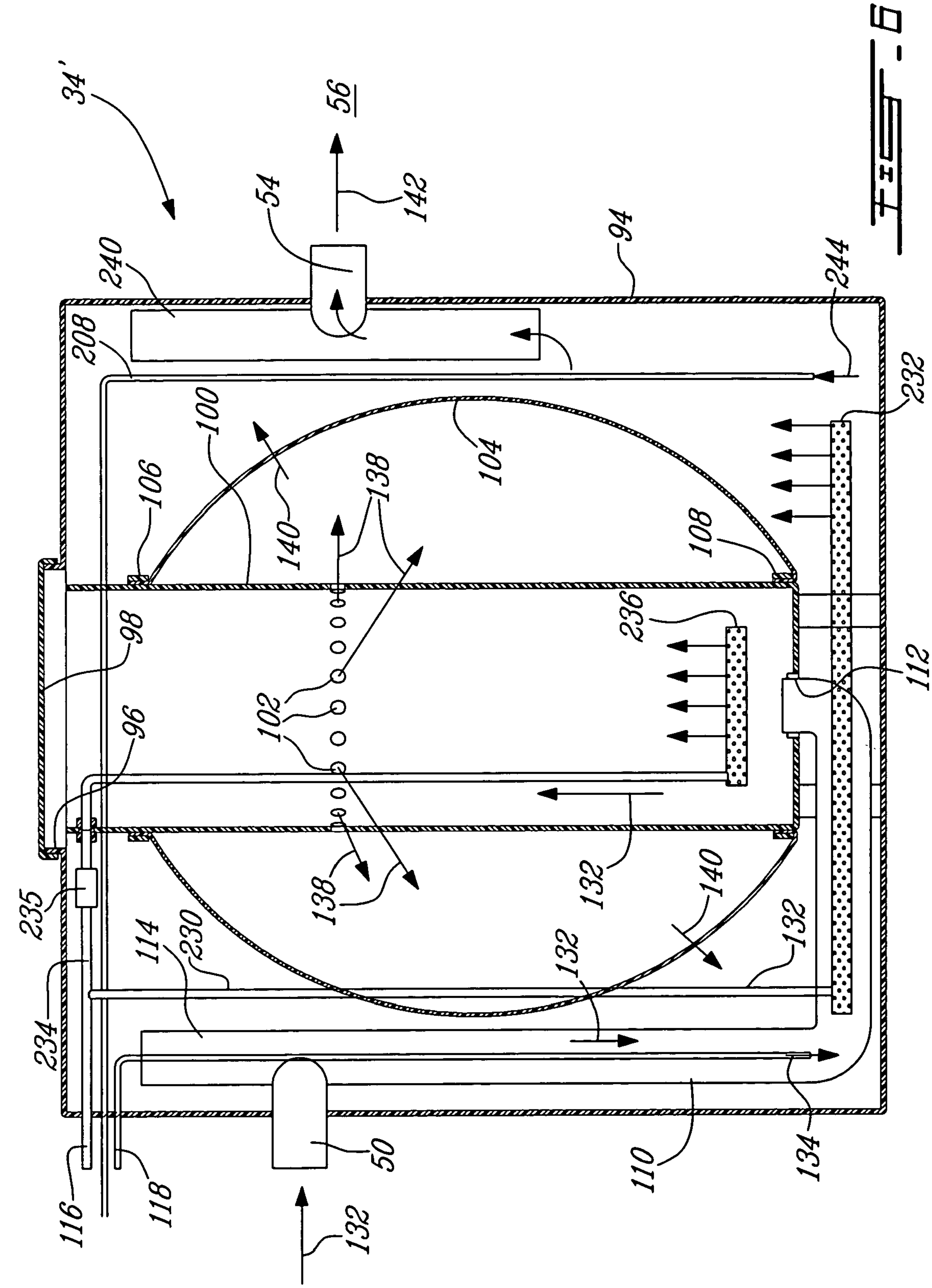
FIG. 6 is a schematic sectional side elevational view of the third sanitization module of the wastewater treatment system of FIG. 4.
Figure 7:
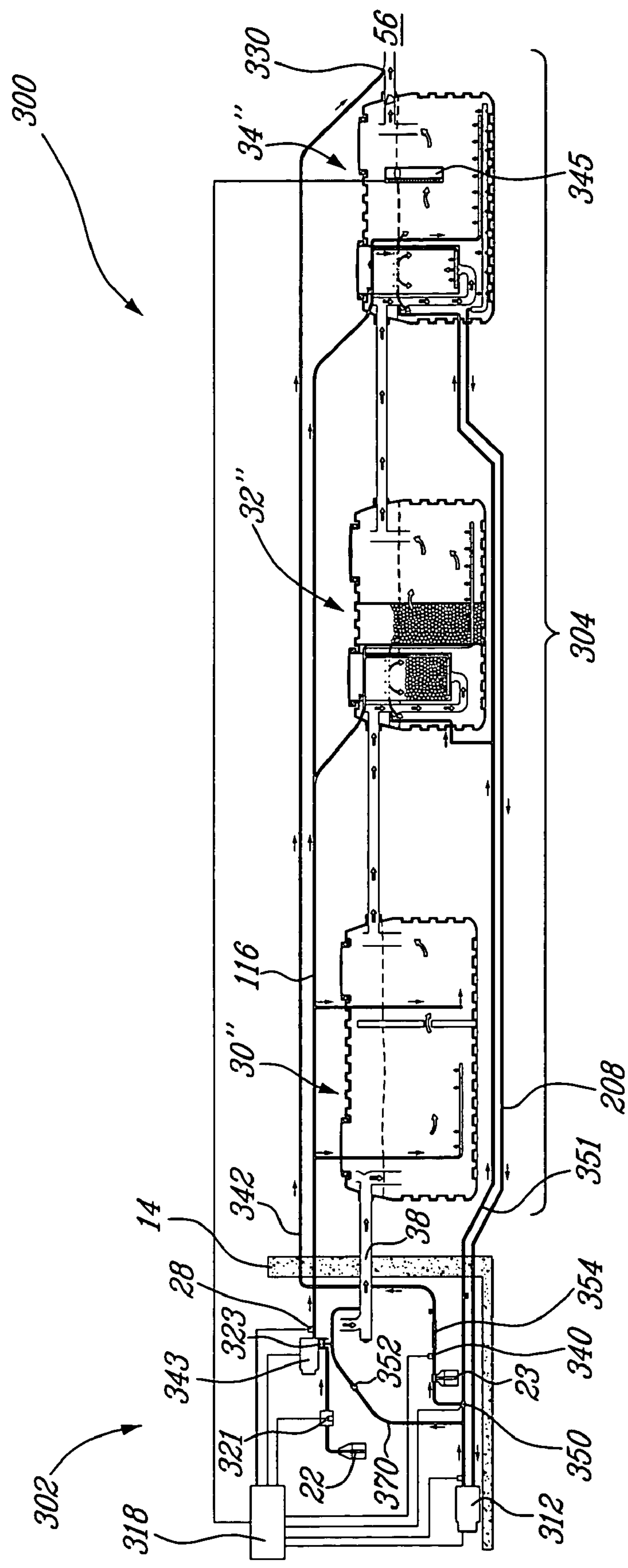
FIG. 7 is a schematic sectional side elevational view of a wastewater treatment system according to a third embodiment of the present invention.

Turning now to FIGS. 4–6 of the appended drawings, a wastewater treatment system 200 according to a second embodiment of the present invention will be described.

It is to be noted that since the system 200 is very similar to the system 10 described hereinabove with reference to FIGS. 1–3, and for concision purposes, only the differences between these two systems will be described in details hereinbelow.

The system 200 includes a control assembly 202 and a wastewater sanitization assembly 204.

The control assembly 202 includes:

- a controller 18' comprising an integrated electronic circuit (not shown);
- a flow sensor 20; connected to the controller 18, which detects the amount of freshwater entering in the building 14;
- two reservoirs 22, 23 which respectively contain a solution containing enzymes and bacteria and an aseptic solution, such as for example, hydrogen peroxide, as will be described hereinbelow;
- an electronically controlled valve 24 interconnecting the reservoirs 22 to the conduit 26 and controlled by the controller 18;
- an intermediate mixing reservoir 206 connected to the reservoir 23 via the valve 26 and receiving treated wastewater from the sanitization module 34' via a conduit 208 and a pump 210 controlled by the controller 18';
- a pump 212 returning a controlled mix of the aseptic solution and of treated wastewater to the sanitization module 34'; the pump 212 also optionally assisting the mixing of the wastewater contained in the sanitization module 34';
- optionally, a water quality testing apparatus (not shown) mounted to or near the mixing reservoir 206 to test the incoming wastewater from the module 34' and to supply this information to the controller 18' (see dashed line 214); and
- an electronically controlled valve 28' supplying compressed air to the sanitization modules 32' and 34'.

As will be understood by one skilled in the art, the function of the intermediate mixing reservoir 206 is to provide a larger quantity of liquid to pump to the second sanitization module 34'. Indeed, it has been found that it may be interesting to use a concentrated aseptic solution and to dilute it with water coming from the second sanitization module 34'. By doing this, it is possible to install a water testing apparatus (not shown) to ensure that the treated wastewater released in the external environment 56 meets the appropriate standards.

Of course, it would be possible to mix the concentrated aseptic solution with fresh water.

Alternatively, the mixing reservoir 206 could be replaced by an internal mixer, for example a tube provided with two inlets; an outlet and internal blades forcing the mixing of the liquids entering the inlets. The expression "mixing reservoir" is therefore to be construed as including internal mixers.

Another potential advantage of having a pump 210 it to mix the wastewater contained in the module 34 by constantly pumping wastewater and returning it without necessarily adding aseptic solution thereto.

The wastewater sanitization assembly 204 is very similar to the wastewater sanitization assembly 16.

A first difference between these systems is the fact that compressed air is supplied to both sanitization modules 32' and 34' (see conduits 116 and 216).

Furthermore, turning to FIG. 5 of the appended drawings, the tube 216 bringing compressed air to the module 32' is divided in 2 via a "T" junction. A first tube 218 goes down to an air diffuser 220. The air diffuser 220 creates small air bubbles (see arrows 222) that oxygenate the wastewater that has filtered through the filter 78.

A second tube 224 enters the cylindrical container 76 and leads to an air diffuser 226 that creates small air bubbles (see arrows 228) that oxygenate the wastewater that is present in the container 76. It is to be noted that a manually adjustable restriction valve 225 is provided to allow the initial adjustment of the quantity of air supplied to both diffusers 220 and 232. Indeed, since the diffusers are not the same dimensions and are provided at different height such a valve is appropriate for initial adjustments of the system.

Similarly, the sanitization module 34' includes the split air tube 230, 234, the two air diffusers 232 and 236 and the valve 235 (see FIG. 6).

The diffusers 220 and 232 may be, for example, 60 inches (about 1.5 m) Oxy-Pro™ diffusers sold by Aquipro (St-Appolinaire, Quebec, Canada) and the diffusers 226 and 236 may be, for example, 12 inches (about 0.3 m) Oxy-Pro™ diffusers sold by Aquipro (St-Appolinaire, Quebec, Canada).

Returning to FIG. 5, another difference is the outlet of the sanitization module 32'. Indeed, this outlet is formed of a T-junction 238 to allow the water to flow from a lower portion of the module 32 (see arrow 242). Similarly, the module 34 includes a T-junction 240 as an outlet.

Another difference concerns the aforementioned conduit 208 used to pump a small quantity of treated wastewater from the second sanitization module 34' into the mixing reservoir 206 (see arrow 244).

As will be understood by one skilled in the art, the operation of the wastewater treatment system 200 is very similar to the operation of the wastewater treatment system 10 and will therefore not be discussed further herein.

Turning now to FIGS. 7–10 of the appended drawings, a wastewater treatment system 300 according to a third embodiment of the present invention will be described.

It is to be noted that since the system 300 is very similar to the system 200 described hereinabove with reference to FIGS. 4–6, and for concision purposes, only the differences between these two systems will be described in details hereinbelow.

The system 300 includes a control assembly 302 and a sanitization assembly 304.

The control assembly 302 includes:

- a controller 318 comprising an integrated electronic circuit (not shown);
- two reservoirs 22, 23 which respectively contain a solution containing enzymes and/or bacteria and an aseptic solution, such as for example, hydrogen peroxide;
- a valve 321 controlled by the controller 318 and provided between the reservoir 22 and the a ventury-effect distributor 323 that connects to the wastewater outlet 38;
- a pump 312 that a) returns treated wastewater from the sanitization module 34" to the septic tank 30", the first sanitization module 32" and the second sanitization module 34"; and b) allows the ejection of treated wastewater through a treated wastewater outlet 330.
- an electronically controlled output valve in the form of a three-way valve 350 interconnecting the pump 312, the treated wastewater outlet 330 and the tube 351. When in a first state, the three-way valve 350 forces treated wastewater to return to the sanitization modules 32" and 34" via the tube 351, while when in a second state, the three-way valve 350 forces treated wastewater to flow to the wastewater outlet 330;
- a manual valve 352 for adjusting a flow of treated wastewater flowing to the wastewater outlet 38 through a conduit 370;
- a pressure sensor 340 provided between the reservoir 23 and the treated wastewater outlet 330;
- an optional mixer 342, which can be passive or active, provided between the reservoir 23 and the treated wastewater outlet 330;
- an air pump 343 supplying compressed air to the septic tank 30" and the sanitization modules 32" and 34" via an electronically controlled valve 28; and
- a wastewater level sensor 345 provided in the second sanitization module 34" to determine the level of treated wastewater therein; the sensor 345 supplying wastewater level data to the controller 318.

The reservoir 23, containing the aseptic solution to be added to the treated wastewater as it is exited to the environment, is provided between the three-way valve 350 and the treated wastewater exit 330. When the three-way valve is in the second state, treated wastewater flows in a conduit 342 connecting the three-way valve 350 and the treated wastewater outlet 330. This flow causes the aseptic solution to be provided to the treated wastewater through a ventury-type suction effect from the reservoir 23. Optionally, a mixer 354, which can be active or passive, is provided between the reservoir 23 and the treated wastewater exit 330.

The wastewater sanitization assembly 304 is very similar to the wastewater sanitization assembly 204. However, there are a few differences between these two systems that will be detailed herein below.

A first difference between these systems is that in the wastewater sanitization assembly 304, compressed air is supplied to the septic tank 30" in addition to the sanitization modules 32" and 34".

Figure 8:
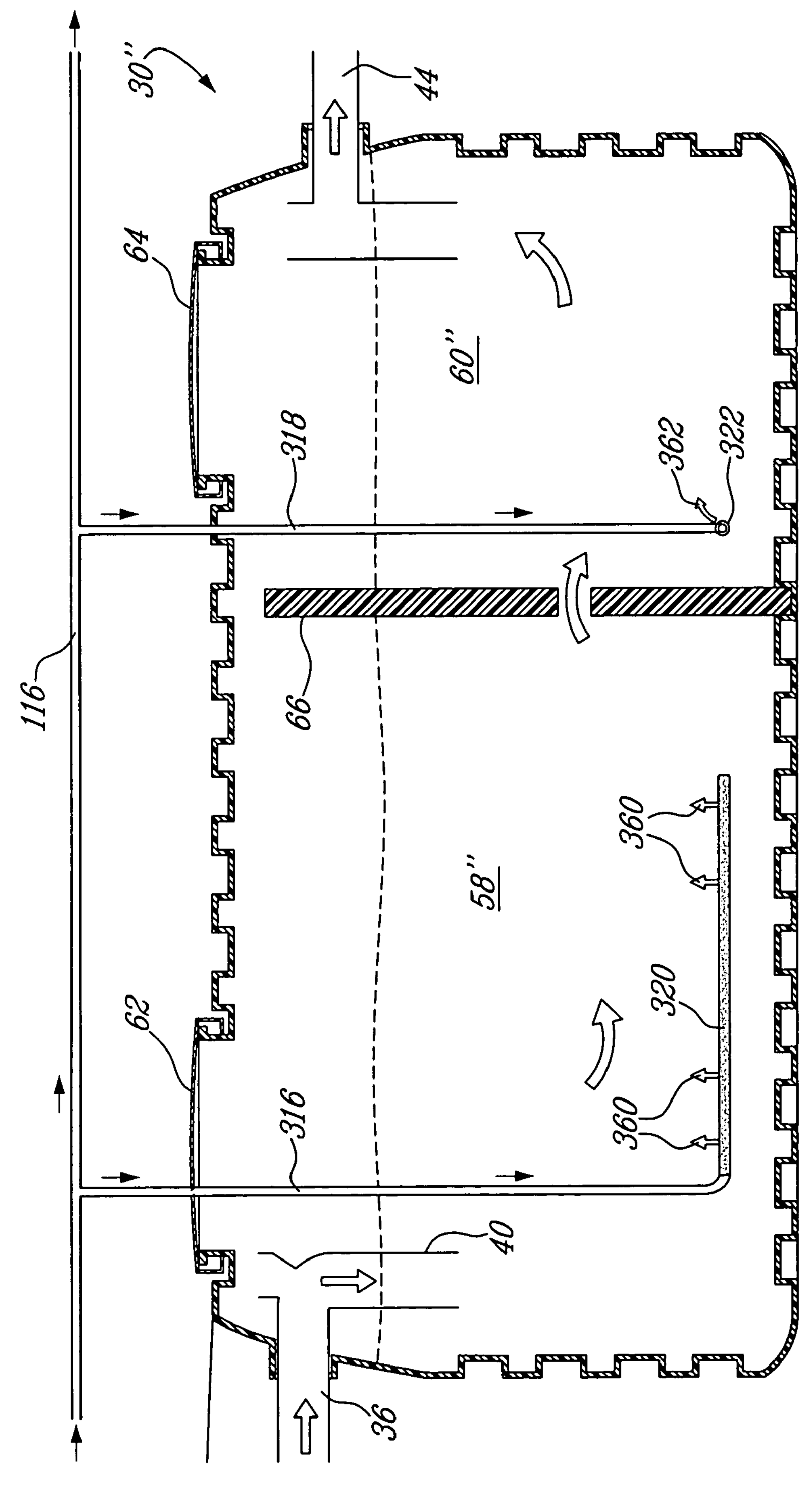
FIG. 8 is a schematic sectional side elevational view of the non-conventional septic tank of the wastewater treatment system of FIG. 7.

As seen on FIG. 8, compressed air is supplied to the two compartments 58" and 60" respectively through tubes 316 and 318. However, compressed air could also be supplied to only one of the two compartments 58" and 60". Each of the tubes 316 and 318 is connected to a respective air diffuser 320 and 322, each creating small air bubbles (see arrows 360 and 362) that oxygenate the wastewater contained in the septic tank 30 to promote aerobic digestion of the organic particles in the wastewater.

It is to be noted that a manually adjustable restriction valve (not shown) is provided to allow the initial adjustment of the quantity of air supplied to both diffusers 320 and 322. Indeed, since the diffusers are not the same dimensions and may provided at different heights such a valve is appropriate for initial adjustments of the system.

The diffuser 320 may be, for example, 60 inches (about 1.5 m) Oxy-Pro™ diffusers sold by Aquipro (St-Appolinaire, Quebec, Canada) and the diffusers 322 may be, for example, 12 inches (about 0.3 m) Oxy-Pro™ diffusers sold by Aquipro (St-Appolinaire, Quebec, Canada).

Figure 9:
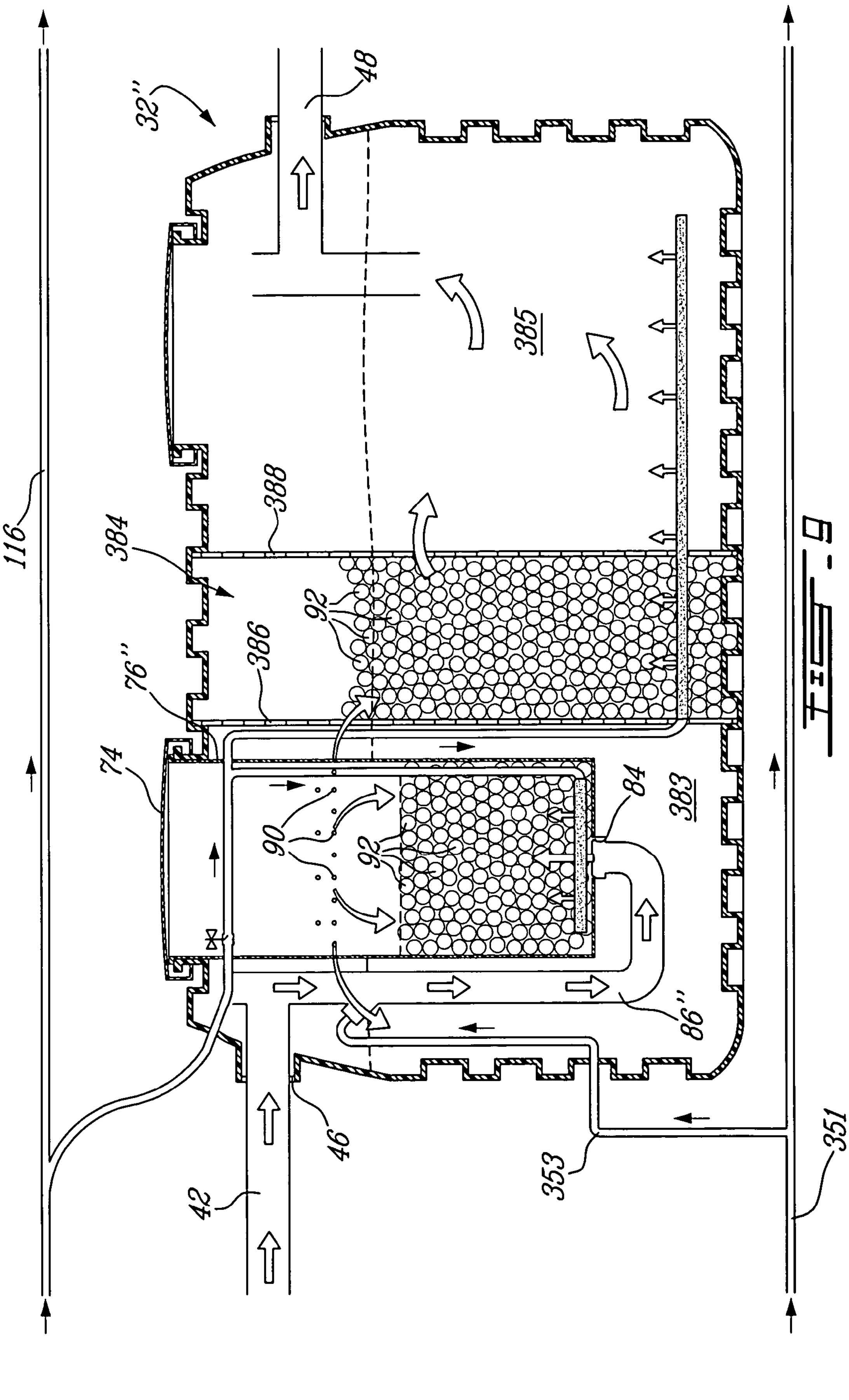
FIG. 9 is a schematic sectional side elevational view of the first sanitization module of the wastewater treatment system of FIG. 7.
Figure 10:
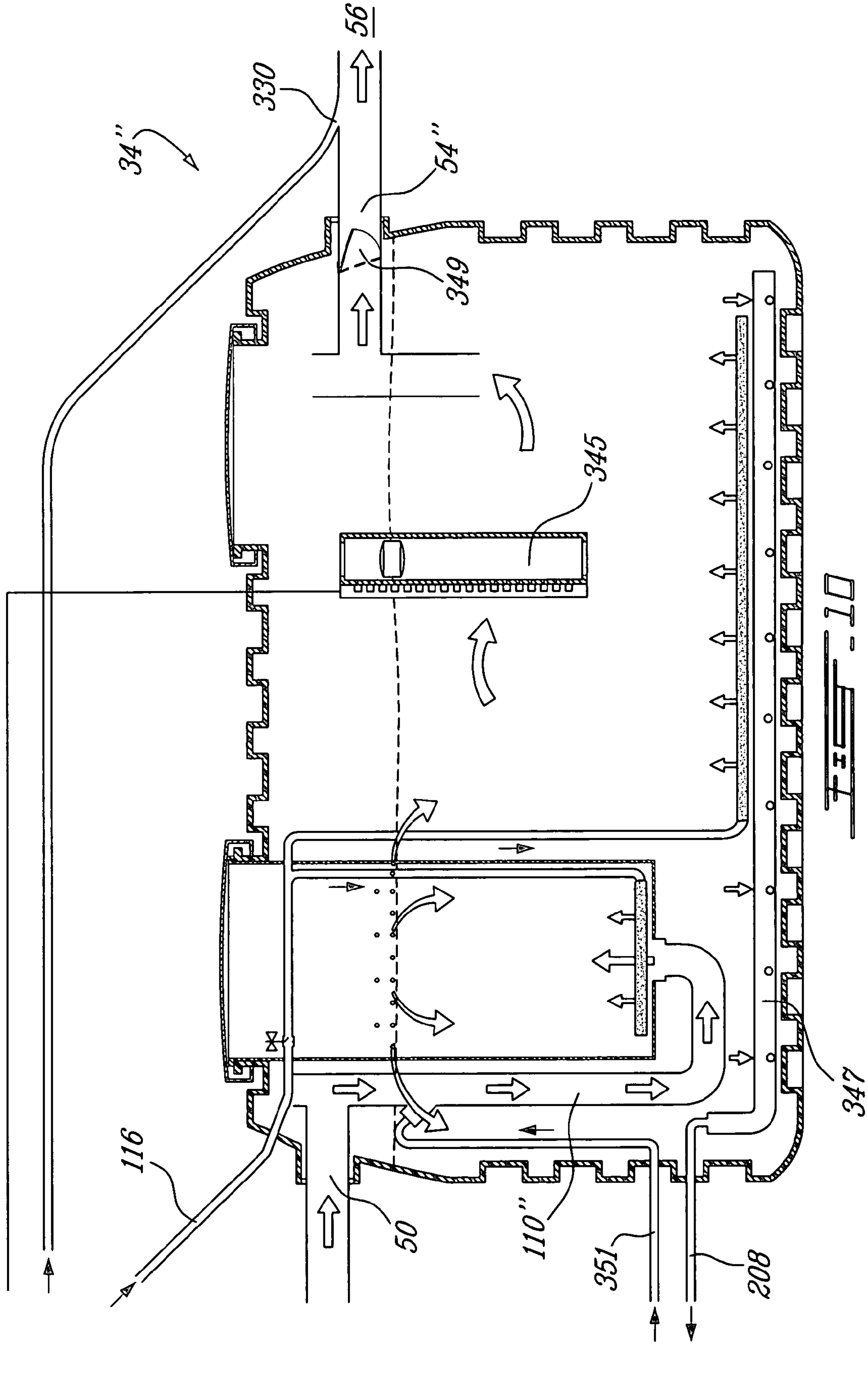
FIG. 10 is a schematic sectional side elevational view of the second sanitization module of the wastewater treatment system of FIG. 7.

Another difference concerns the recirculation of treated wastewater from the second sanitization module 34" to the first sanitization module 32" and to the second sanitization module 34". As can be seen from FIG. 7, the outlet of pump 312 returns water to the modules 32" and 34" when the waive 350 is in its first state. FIG. 9 illustrates that conduit 351 is branched and that conduit 353 enters the J-shaped conduit 86". Similarly, FIG. 10 illustrates that conduit 351 enters the J-shaped conduit 110".

Turning now more specifically to FIG. 9 of the appended drawings, the first sanitization module 32" will be described in greater details, focussing on the differences.

The module 32" includes a generally vertical container 76" similar to the container 76 of FIG. 5 but not centrally positioned in the module 32". Also, the container 76" is not enclosed by a pouch. However, it still has its bottom inlet 84 and peripheral outlets 90.

The module 32" also includes a double hollow wall 384 that is generally vertical and extends throughout a cross-section of the sanitization module 32" thereby dividing the sanitization module into two compartments 383 and 385.

The double hollow wall 384 includes a plurality of inlet apertures 386 and a plurality of outlet apertures 388. In addition, the double hollow wall 384 contains a plurality of bio-elements 92. As will easily be understood by one skilled in the art, in addition to percolating through the bio-media elements 92 contained in the vertical container 76, wastewater circulating in the wastewater treatment system 300 passes through the bio-media elements 92 contained in the double hollow wall 384. Furthermore, the above-mentioned recirculation of the treated wastewater from the module 34" to the module 32" forces the water to pass through the bio-elements 92 a number of times before it is discharged to the environment.

Turning now briefly to FIG. 10 of the appended drawings, the second sanitization module 34" will be described. The module 34" is very similar to module 32" of FIG. 9. However, module 34" does not include the double hollow wall 384 nor the bio-media elements 92. The return conduit 208 used to pump treated wastewater for its recirculation via pump 312 or for its discharge in the environment is connected to a perforated tube 347 that runs the length of the module 34". The outlet 54" of the module 34 includes a check-valve 349 preventing water from entering the module 34".

The wastewater level sensor 345 determines the level of treated wastewater therein; the sensor 345 supplies wastewater level data to the controller 318. The sensor 345 is represented in FIG. 10 as being a float type sensor. However, other types of sensors could be used. One skilled in the art is believed to be in a position to select an appropriate sensor for the conditions of usage.

It is to be noted that the sensor 345 could be positioned in any of the septic tank 30", the first module 32" and the second module 34".

As will be understood by one skilled in the art, the operation of the wastewater treatment system 300 is very similar to the operation of the wastewater treatment system 200 and will therefore not be completely detailed herein. However, two major differences exist in the operation of these two systems.

First, the system 300 operates in a batch mode. Specifically, the level of wastewater, as determined by the wastewater level sensor 345 is continuously supplied to the controller 318.

Most of the time, the three-way valve 350 is in the first state, wherein no treated wastewater flows to the treated wastewater outlet 330. However, when a predetermined quantity of wastewater is present in the second module 34", the three-way valve 350 is turned to the second state by the controller 318. In the second state, treated wastewater is discharged by the treated wastewater outlet 330. The controller reverts the three-way valve 350 to the first state when a predetermined quantity of treated wastewater has been discharged by the treated wastewater outlet 330. The predetermined quantity of treated wastewater is determined from pressure measurement from the pressure sensor 340.

It has been found that a predetermined quantity of discharged wastewater of about 100 gallons (about 450 liters) is suitable when the total capacity of the sanitization assembly ranges from about 1000 to 2500 gallons (about 4500 to about 11 500 liters).

After the controller 318 has instructed the valve 350 to eject a predetermined quantity of treated wastewater to the environment via the outlet 330, the controller 318 controls the valve 321 so that a predetermined quantity of the first treatment solution, i.e. the bacteria and/or enzyme containing solution, is supplied to the building's wastewater outlet 38 via the reservoir 22.

The second difference between the system 300 and the system 200 resides in the recirculation of treated wastewater within the system 300. To that effect, treated wastewater from the sanitization module 34" is recirculated by the pump 312 to the sanitization modules 32" and 34". The recirculation allows treated wastewater to be processed numerous times by the sanitization modules 32" and 34", thereby improving the efficiency of the wastewater treatment. Notably, the recirculation forces the wastewater to flow through the bio-media elements 92 many times, thereby augmenting the effective surface presented by the bio-media elements 92.

One skilled in the art will understand that the pump 312, which is relatively large to allow both the recirculation of the wastewater and its discharge to the environment, could be replaced by a smaller pump for the recirculation of wastewater and another pump for the discharge of wastewater. This way, power could be saved by running the smaller pump for recirculation.

It is also to be noted that the recirculation of wastewater from the modules 32" and 34" needs not be continuous but could be cyclic to allow solids present in the wastewater to precipitate. Similarly, the injection of compressed air into the tank 30" and into the modules 32" and 34" could be stopped for predetermined intervals.

Furthermore, since the aseptic solution is provided to the treated wastewater only further to its redirection towards the treated wastewater outlet 330, enzymes and bacteria injected in the wastewater remain active throughout the recirculation.

One advantage of using the wastewater treatment system of the present invention is that the electrical components are mounted inside the building 14 and not in the ground 56. Indeed, this is an advantage since it allows to externally control the treatment operations and to facilitate the maintenance of the equipment. Similarly, it increases the useful life of the electronic circuitry since it is kept in a controlled environment.

Another advantage of the wastewater treatment system is that new bacteria and enzyme containing solution is regularly added to the wastewater exiting the building 14, thereby ensuring that there is constantly an adequate quantity of enzymes and bacteria in the septic tank and sanitization module 32.

One skilled in the art will also understand that the maintenance of the sanitization modules 32 and 34 may easily be done via the covers 74 and 98 which may be lightly recovered with ground (as shown in some of the appended figures) or could be level with the ground for easier reach.

Depending on the degree of treatment of the wastewater, it would be possible to omit the filtering pouches 78 and 104. In addition, while not illustrated in FIGS. 3 and 6 and 10, bio-media elements similar to the bio-media elements 92 could be provided in the sanitization module 34, 34' and 34".

It is to be noted that the expression "free flow" as used in the present description and in the appended claims relates to water flowing without any externals forces such as pumps, i.e., which follows his natural "downward" course.

Of course, it will easily be understood by one skilled in the art that the dimensions of the elements of the system described hereinabove could be adapted to suit different ranges of water treatment.

Although the present invention has been described hereinabove by way of preferred embodiments thereof, it can be modified, without departing from the spirit and nature of the subject invention as defined in the appended claims.

What is claimed is:

1. A system for treating wastewater from a building including a fresh water inlet and a wastewater outlet connected to a septic tank; said system comprising:

a wastewater sanitization assembly including:

a first sanitization module provided downstream from the septic tank;

a second sanitization module provided downstream from said first sanitization module;

a control assembly including:

a controller;

a fresh water sensor associated with the fresh water inlet and connected to said controller to supply fresh water entry data to said controller;

a first reservoir to contain a first wastewater treatment solution;

a first pump controlled by said controller and provided between said first reservoir and the wastewater outlet;

a second reservoir to contain a second wastewater treatment solution;

a second pump controlled by said controller and provided between said second reservoir and said second sanitization module;

wherein said controller controls said first and second pumps so that a) a quantity of the first wastewater treatment solution supplied to said wastewater outlet is a function of the sensed freshwater entering said building; and b) a quantity of the second wastewater treatment solution supplied to said second sanitization module is a function of the sensed freshwater entering said building.

2. The wastewater treatment system of claim 1, wherein said first wastewater treatment solution contains at least one element selected from the group consisting of enzymes and bacteria.

3. The wastewater treatment system of claim 1, wherein said second wastewater treatment solution contains an aseptic solution.

4. The wastewater treatment system of claim 1, wherein said control assembly also includes a valve controlled by the controller and provided between a compressed air source and said second sanitization module; and said second sanitization module includes at least one air diffuser connected to said valve.

5. The wastewater treatment system of claim 1, wherein said control assembly also includes a valve controlled by the controller and provided between a compressed air source and said first sanitization module; and said first sanitization module includes at least one air diffuser connected to said valve.

6. The wastewater treatment system of claim 1, wherein said first sanitization module includes:

a body;

a generally vertical container provided with a bottom inlet and at least one peripheral outlet aperture; said container being mounted in said body a plurality of bio-media elements provided in said container;

a filtering pouch enclosing said vertical container;

whereby a) wastewater entering said bottom inlet of said first sanitization module percolates through said bio-media elements before exiting the container via said at least one peripheral outlet aperture; and b) wastewater exiting said container via said at least one peripheral aperture is filtered through said filtering pouch.

7. The wastewater treatment system of claim 1, wherein said second sanitization module includes:

a body;

a generally vertical container provided with a bottom inlet and at least one peripheral outlet aperture; said container being mounted in said body;

a filtering pouch enclosing said vertical container;

whereby a) wastewater entering said bottom inlet of said first sanitization module percolates through said bio-media elements before exiting the container via said at least one peripheral outlet aperture; and b) wastewater exiting said container via said at least one peripheral aperture is filtered through said filtering pouch.

8. The wastewater treatment system of claim 1, wherein said control assembly also includes:

an intermediate mixing reservoir provided between said second pump and said second sanitization module;

a third pump provided between said intermediate mixing reservoir and said second sanitization module; said third pump being controlled by said controller;

a fourth pump provided between said second sanitization module and said intermediate mixing reservoir; said fourth pump being controlled by said controller;

wherein said fourth pump transfers treated wastewater from said second sanitization module to said intermediate mixing reservoir to dilute said second treatment solution pumped in said intermediate mixing reservoir by said second pump; and said third pump returns the diluted second treatment solution to said second sanitization module.

9. The wastewater treatment system of claim 8, wherein said control assembly also includes a water quality testing apparatus associated with said intermediate mixing reservoir to test the quality of the treated wastewater pumped from the second sanitization module by said fourth pump.

10. A system for treating wastewater from a building including a fresh water inlet and a wastewater outlet; said system comprising:

a sanitization assembly having an inlet connected to the wastewater outlet of the building and a treated wastewater outlet;

a controller;

a sensor associated with said sanitization assembly and connected to said controller to supply thereto data indicative of a quantity of wastewater present in the sanitization assembly;

an output pump controlled by said controller and having an inlet connected to said treated wastewater outlet and an outlet connected to the environment;

wherein, when said sensor indicates that the quantity of wastewater in said sanitization assembly has reached a predetermined level, said controller controls said output pump so as to eject a predetermined amount of treated wastewater from the sanitization assembly to the environment.

11. The system for treating wastewater of claim 10 comprising:

a first reservoir to contain a first wastewater treatment solution;

a first wastewater treatment solution pump provided between said first reservoir and said sanitization assembly;

wherein, when said sensor indicates that the quantity of wastewater in said sanitization assembly has reached a predetermined level, said first wastewater treatment solution pump injects a predetermined amount of the first wastewater treatment solution in the sanitization assembly.

12. The system for treating wastewater of claim 11, wherein said sanitization assembly includes:

a septic tank having an inlet connected to the building wastewater outlet and an outlet;

a first sanitization module having an inlet connected to said outlet of said septic tank and an outlet; and a second sanitization module having an inlet connected to said outlet of said first sanitization module and an outlet defining said treated wastewater outlet.

13. The system for treating wastewater of claim 12, wherein said sensor is a float-type sensor associated with one of the septic tank, the first sanitization module and the second sanitization module.

14. The system for treating wastewater of claim 12, further comprising a compressed air source connected to at least one of said septic tank, said first sanitization module and said second sanitization module via an air valve controlled by said controller.

15. The system for treating wastewater of claim 14, further comprising at least one air diffuser provided in at least one of said septic tank, said first sanitization module and said second sanitization module; said at least one air diffuser being connected to said compressed air source via said valve.

16. The system for treating wastewater of claim 12, wherein said first sanitization module includes:

a body;

a generally vertical container provided with a bottom inlet and at least one peripheral outlet aperture; said container being mounted in said body;

a plurality of bio-media elements provided in said container;

whereby wastewater entering said bottom inlet of said vertical container percolates through said bio-media elements before exiting said vertical container via said at least one peripheral outlet aperture.

17. The system for treating wastewater of claim 12, wherein said first sanitization module includes:

a body;

a generally vertical container mounted in said body downstream from said inlet and upstream from said outlet of said first sanitization module, said container including a plurality of inlet apertures and a plurality of outlet apertures, said container dividing said body into two compartments; and a plurality of bio-media elements provided in said container;

whereby wastewater entering said inlet apertures of said container pass through said bio-media elements before exiting said container via said outlet apertures.

18. The system for treating wastewater of claim 12, wherein said second sanitization module includes:

a body;

a generally vertical container provided with a bottom inlet and at least one peripheral outlet aperture; said container being mounted in said body;

whereby wastewater entering said bottom inlet of said vertical container percolates through said bio-media elements before exiting said container via said at least one peripheral outlet aperture.

19. The system for treating wastewater of claim 12, further comprising a fluid circulating pump having an inlet connected to said second sanitization module and at least one outlet connected to at least one of said septic tank, said first sanitization module and said second sanitization module for recirculating wastewater.

20. The system for treating wastewater of claim 12, further comprising:

a second reservoir to contain a second wastewater treatment solution;

a second wastewater treatment solution pump provided between said output pump outlet and said environment; said second wastewater treatment solution pump being controlled by said controller;

wherein when said output pump ejects a predetermined amount of treated wastewater from the sanitization assembly to the environment, said second wastewater treatment solution pump injects a predetermined amount of the second treatment solution to the treated wastewater ejected.

21. The system for treating wastewater of claim 20, wherein said second wastewater treatment solution includes an aseptic solution.

22. The system for treating wastewater of claim 20, further comprising a three-way valve including an inlet connected to said outlet of said output pump, a first outlet connected to at least one of said septic tank, said first sanitization module and said second sanitization module for recirculating wastewater and a second outlet connected to said second wastewater treatment solution pump; wherein said three-way valve is so controlled by said controller as to direct the flow of wastewater from the outlet of the output pump either to the second wastewater treatment solution pump and to at least one of said septic tank, said first sanitization module and said second sanitization module.

23. The system for treating wastewater of claim 11, wherein said first wastewater treatment solution pump includes a ventury-effect element.

24. The system for treating wastewater of claim 20, wherein said second wastewater treatment solution pump includes a ventury-effect element.

25. The system for treating wastewater of claim 12, wherein said first wastewater treatment solution contains at least one element selected from the group consisting of enzymes and bacteria.

26. The system for treating wastewater of claim 20, further comprising a mixer provided between said second wastewater treatment solution pump and said environment for mixing the second wastewater treatment solution and the ejected treated wastewater.

27. The system for treating wastewater of claim 11, wherein said sensor includes a fresh water sensor associated with the fresh water inlet.

* * * * *